US012002402B2

(12) United States Patent
Choi et al.

(10) Patent No.: US 12,002,402 B2
(45) Date of Patent: Jun. 4, 2024

(54) LATCH CIRCUIT FOR REDUCING NOISE BASED ON CENTER GRAYSCALE AND DATA DRIVER INCLUDING THE SAME

(71) Applicant: LX Semicon Co., Ltd., Daejeon (KR)

(72) Inventors: Gi Baek Choi, Daejeon (KR); Jong Hwi Park, Daejeon (KR); Yong Jung Kwon, Daejeon (KR); Jung Bae Yun, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/084,298

(22) Filed: Dec. 19, 2022

(65) Prior Publication Data

US 2023/0215325 A1 Jul. 6, 2023

(30) Foreign Application Priority Data

Dec. 30, 2021 (KR) ........................ 10-2021-0193094

(51) Int. Cl.
*G09G 3/20* (2006.01)

(52) U.S. Cl.
CPC ..... *G09G 3/2007* (2013.01); *G09G 2310/027* (2013.01); *G09G 2310/0297* (2013.01); *G09G 2310/08* (2013.01); *G09G 2320/02* (2013.01)

(58) Field of Classification Search
CPC .................................................... G09G 3/2007
USPC .......................................................... 345/691
See application file for complete search history.

(56) References Cited

U.S. PATENT DOCUMENTS

2010/0321412 A1* 12/2010 Weng .................. G09G 3/3688 345/204
2013/0235007 A1* 9/2013 Yen ...................... G09G 3/3685 345/204
2021/0090524 A1* 3/2021 In ......................... G09G 3/2003

FOREIGN PATENT DOCUMENTS

KR 10-0727884 B1 6/2007

* cited by examiner

*Primary Examiner* — Long D Pham
(74) *Attorney, Agent, or Firm* — POLSINELLI PC

(57) ABSTRACT

An embodiment provides a latch circuit which outputs, to a digital analog converter (DAC), a digital signal including grayscale data, the latch circuit including a first latch configured to store the digital signal and a second latch configured to output the digital signal by controlling first timing at which a level of a first signal included in the digital signal becomes an enable level, based on a center grayscale. The grayscale data includes first grayscale data and second grayscale data.

20 Claims, 15 Drawing Sheets

431B

LATCH CIRCUIT FOR REDUCING NOISE BASED ON CENTER GRAYSCALE AND DATA DRIVER INCLUDING THE SAME

BACKGROUND

1. Technical Field

An embodiment relates to a latch circuit and a data driver including the latch circuit, for a display apparatus.

2. Related Art

With the development of the process technology and driving circuit technology of a display apparatus, resolution of the display apparatus is increased and an ultra high definition (UHD) product is sold. UHD has 3840*2160=the number of 8.30 million pixels. The number of pixels of UHD is approximately four times greater than 1920*1080=the number of 2.07 million pixels than full high definition (FHD). Accordingly, an input image may be more precisely reproduced in UHD than in FHD. Accordingly, sharper and smoother picture quality may be represented in UHD than in FHD. A pixel means a dot, that is, a minimum unit that constitutes a display apparatus or a display image.

A data driver that drives such a display apparatus may include a digital analog converter (DAC) for converting a digital signal into an analog data signal and a buffer for outputting a data signal. Such a DAC includes a plurality of switches.

In the conventional DAC, an effort was made to reduce the number of transistors in order to lower the cost of components and CMOS switches that can be used in all operation voltage range were used. It was reduced by ½ and used.

The problem with this structure is that, in the case of the center grayscale in which the operation voltage range is divided, a lot of noise is generated.

Furthermore, in a conventional DAC, as the number of pixels increases, the time for stabilizing the output (blank time) is insufficient, so there is a problem that DAC noise affects the image.

SUMMARY

An embodiment is for overcoming the aforementioned problem. An embodiment is for reducing noise of a data driver.

Furthermore, an embodiment is for reducing noise occurring when data is changed in a center grayscale.

Furthermore, an embodiment is for reducing the influence of noise on a displayed screen.

Objects to be achieved by an embodiment are not limited to the aforementioned objects, and the other objects not described above may be evidently understood from the description of an embodiment by a person having ordinary knowledge in the art.

An embodiment provides a latch circuit. Such a latch circuit is a latch circuit outputting, to a digital analog converter (DAC), a digital signal including grayscale data, and includes a first latch configured to store the digital signal and a second latch configured to output the digital signal by controlling first timing at which a level of a first signal included in the digital signal becomes an enable level, based on a center grayscale. The grayscale data includes first grayscale data and second grayscale data. The center grayscale is a grayscale between the first grayscale data and the second grayscale data. The first timing is timing at which the second grayscale data is applied by changing from the first grayscale data. The first signal is a most significant bit (MSB) signal.

Furthermore, an embodiment provides a data driver. Such a data driver includes a digital analog converter (DAC) configured to convert, into an analog signal, a digital signal including grayscale data, and a latch circuit configured to transmit the digital signal to the DAC. The latch circuit includes a first latch configured to store the digital signal, and a second latch configured to output the digital signal by controlling first timing at which a level of a first signal included in the digital signal becomes an enable level, based on a center grayscale. The grayscale data includes first grayscale data and second grayscale data. The first timing is timing at which the second grayscale data is applied by changing from the first grayscale data. The first signal is a most significant bit (MSB) signal.

Another embodiment provides a latch circuit. Such a latch circuit is a latch circuit outputting, to a digital analog converter (DAC), a digital signal including grayscale data, and includes a first latch configured to store the digital signal and a second latch configured to output the digital signal by controlling first timing at which a level of a first signal included in the digital signal becomes an enable level and second timing at which a level of the first signal becomes a disable level. The grayscale data includes first grayscale data and second grayscale data. The first timing is timing at which the second grayscale data is applied by changing from the first grayscale data. The second timing is timing at which the first grayscale data is applied by changing from the second grayscale data. The first signal is a most significant bit (MSB) signal.

Furthermore, another embodiment provides a data driver. Such a data driver includes a digital analog converter (DAC) configured to convert, into an analog signal, a digital signal including grayscale data and a latch circuit configured to transmit the digital signal to the DAC. The latch circuit includes a first latch configured to store the digital signal and a second latch configured to output the digital signal by controlling first timing at which a level of a first signal included in the digital signal becomes an enable level and second timing at which a level of the first signal becomes a disable level. The grayscale data includes first grayscale data and second grayscale data. The first timing is timing at which the second grayscale data is applied by changing from the first grayscale data. The second timing is timing at which the first grayscale data is applied by changing from the second grayscale data. The first signal is a most significant bit (MSB) signal.

An embodiment has an effect in that noise of the data driver is reduced.

Furthermore, an embodiment has an effect in that noise occurring when data is changed in a center grayscale is reduced.

Furthermore, an embodiment has an effect in that the influence of noise on a displayed screen is reduced.

DETAILED DESCRIPTION

Hereinafter, a display apparatus according to an embodiment is described with reference to FIG. 1.

Figure 1:
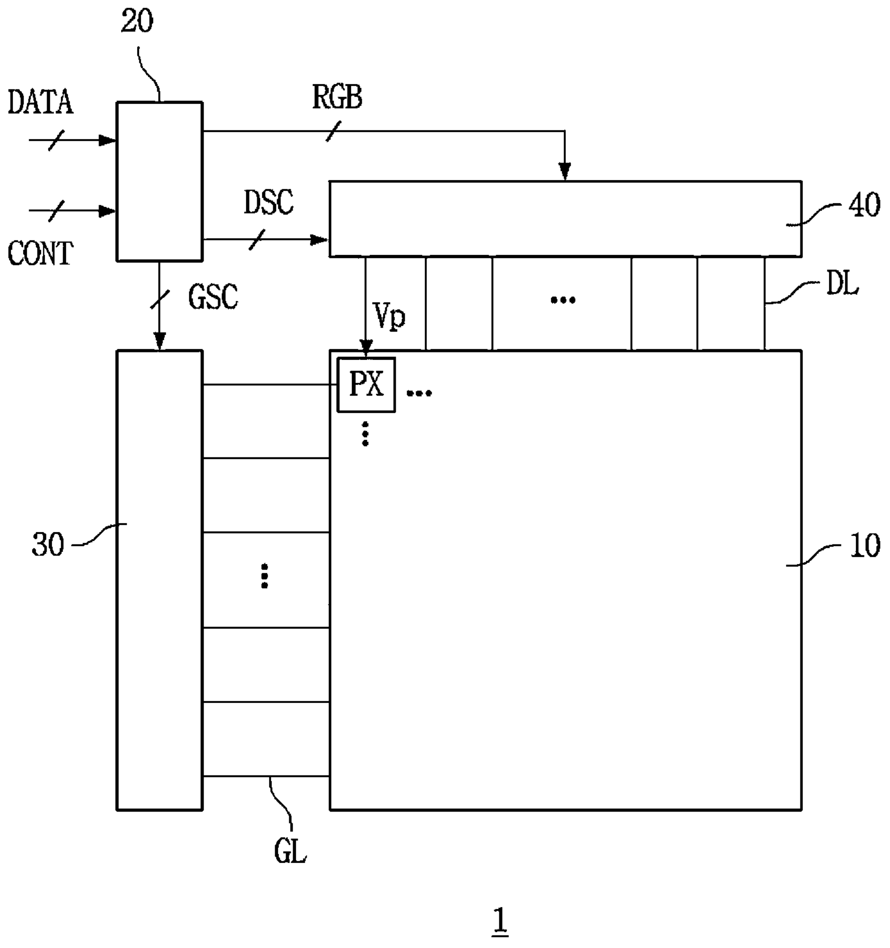
FIG. 1 is a block diagram illustrating a configuration of a display apparatus according to an embodiment.

FIG. 1 is a block diagram illustrating a configuration of a display apparatus according to an embodiment.

Referring to FIG. 1, a display apparatus 1 includes a display panel 10, a timing controller 20, a gate driver 30, and a data driver 40.

The display panel 10 is connected to a plurality of gate lines GL and a plurality of data lines DL, and displays an image in response to output image data RGB. The plurality of gate lines GL may extend in a row direction. The plurality of data lines DL may extend in a column direction that intersects the row direction. The display panel 10 may include a plurality of pixels PX disposed in a matrix form. Each of the plurality of pixels PX may be electrically connected to one of the plurality of gate lines GL or one of the plurality of data lines DL.

The timing controller 20 controls operations of the gate driver 30 and the data driver 40. The timing controller 20 receives input image data DATA and a control signal CONT from an external device (e.g., a host). The input image data DATA may include input pixel data corresponding to each of the plurality of pixels PX. Each of the plurality of pixels data may include red image data R, green image data G, and blue image data B for a corresponding pixel. The control signal CONT may include a master clock signal, a data enable signal, a vertical synchronization signal, and a horizontal synchronization signal, but an embodiment is not limited thereto.

Furthermore, the timing controller 20 may generate the output image data RGB, a gate driver control signal GSC, and a data driver control signal DSC based on the input image data DATA and the control signal CONT. The timing controller 20 may generate the output image data RGB by using the input image data DATA. The timing controller 20 may provide the generated output image data RGB to the data driver 40. The output image data RGB may include output pixel data corresponding to each of the plurality of pixels PX.

Furthermore, the timing controller 20 may generate the gate driver control signal GSC in response to the control signal CONT so that an operation of the gate driver 30 is controlled. The timing controller 20 may provide the gate driver control signal GSC to the gate driver 30. The gate driver control signal GSC may include a vertical initiation signal and a gate clock signal. The timing controller 20 may generate the data driver control signal DSC based on the control signal CONT so that an operation of the data driver 40 is controlled. The timing controller 20 may provide the data driver control signal DSC to the data driver 40. The data driver control signal DSC may include a horizontal initiation signal, a data clock signal, a data load signal, a polarity control signal, and an output control signal.

The gate driver 30 is connected to the plurality of gate lines GL. The gate driver 30 receives the gate driver control signal GSC. The gate driver 30 generates a plurality of gate signals for driving the plurality of gate lines GL in response to the gate driver control signal GSC. The gate driver 30 may apply corresponding gate signals of the plurality of gate signals to corresponding gate lines of the plurality of gate lines GL.

The data driver 40 is connected to the plurality of data lines DL. The data driver 40 receives the data driver control signal DSC and the output image data RGB. The data driver 40 may generate a plurality of pixel voltages Vp each having an analog form in response to the data driver control signal DSC. The data driver 40 may apply the pixel voltage Vp to a corresponding pixel of the plurality of pixels PX through a corresponding data line of the plurality of data lines DL. The data driver 40 is formed in the form of an integrated circuit (IC).

Hereinafter, the data driver according to an embodiment is described with reference to FIG. 2.

Figure 2:
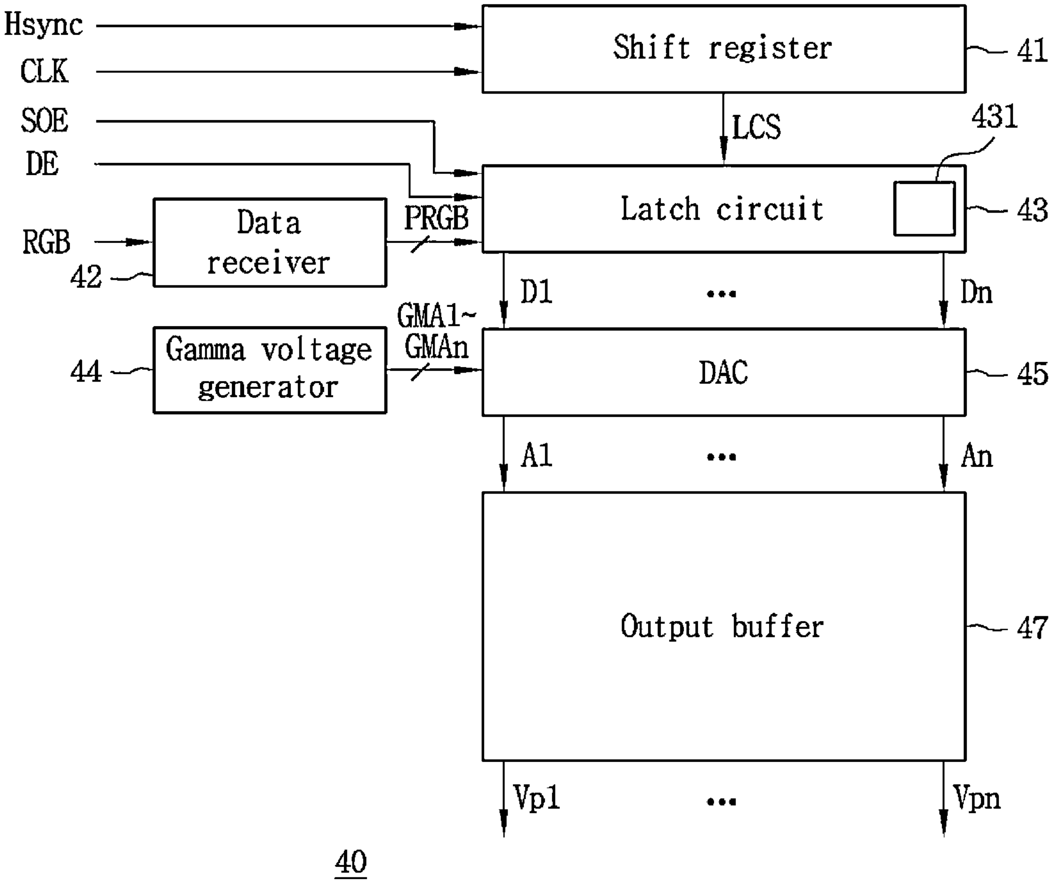
FIG. 2 is a block diagram illustrating a configuration of a data driver according to an embodiment.

FIG. 2 is a block diagram illustrating a configuration of the data driver according to an embodiment.

Referring to FIG. 2, the data driver 40 may include a shift register 41, a data receiver 42, a latch circuit 43, a gamma voltage generator 44, a digital analog converter (DAC) 45, and an output buffer 47.

The shift register 41 includes a plurality of flip-flops, and may generate a latch control signal LCS in response to a horizontal synchronization signal Hsync and a data clock signal CLK. The horizontal synchronization signal Hsync and the data clock signal CLK may be included in the data driver control signal DSC.

The data receiver 42 may receive the output image data RGB and convert the output image data RGB into pixel image data PRGB. The output image data RGB may be provided by the timing controller 20. The output image data RGB may be serial image data.

The latch circuit 43 may generate a plurality of data signals D1 to Dn by sequentially sampling the pixel image data PRGB each having a digital form in response to the latch control signal LCS. The latch circuit 43 may simultaneously output the plurality of data signals D1 to Dn in one line unit, which is sampled in accordance with a source output enable signal SOE. The source output enable signal SOE may be included in the data driver control signal DSC.

Furthermore, the latch circuit 43 may include a delay circuit 431.

The delay circuit 431 may control, in response to a delay signal DE, timing at which a first digital signal (the most significant bit (MSB)) is applied. For example, the latch circuit 43 may control, in response to the delay signal DE, the timing at which the first digital signal MSB is applied so that the first digital signal MSB is delayed for a delay time DT (refer to FIG. 12) and a level thereof becomes an enable level. Furthermore, the latch circuit 43 may control, in response to the delay signal DE, the timing at which the first digital signal MSB is applied so that the first digital signal MSB is delayed for a delay time DT (refer to FIG. 14) and a level thereof becomes a disable level. A detailed method of delaying, by the delay circuit 431, the first digital signal MSB is described later.

The gamma voltage generator 44 may generate the plurality of gamma voltages GMA1 to GMAn in response to a voltage or signal supplied from the inside or outside thereof.

The DAC 45 receives the plurality of data signals D1 to Dn each having a digital form from the latch circuit 43. The DAC 45 may convert the plurality of data signals D1 to Dn into a plurality of analog signals A1 to An in one line unit in response to the plurality of gamma voltages GMA1 to GMAn.

The plurality of data signals D1 to Dn may include the first digital signal (the most significant bit (MSB)) and a second digital signal (the least significant bit (LSB)).

The DAC 45 generates a first voltage $V_L$ and a second voltage $V_H$ through a first DAC 4511 (refer to FIG. 3) and then outputs the first voltage $V_L$ and the second voltage $V_H$ as the plurality of analog signals A1 to An through a second DAC 4512. A detailed configuration of the DAC 45 is described later.

The output buffer 47 may generate a plurality of pixel voltages Vp1 to Vpn by amplifying (or amplifying and compensating for) the plurality of analog signals A1 to An. The output buffer 47 may apply a corresponding pixel voltage of the plurality of pixel voltages Vp1 to Vpn to each of the plurality of data lines DL.

Hereinafter, the DAC 45 according to an embodiment is described in detail with reference to FIG. 3.

Figure 3:
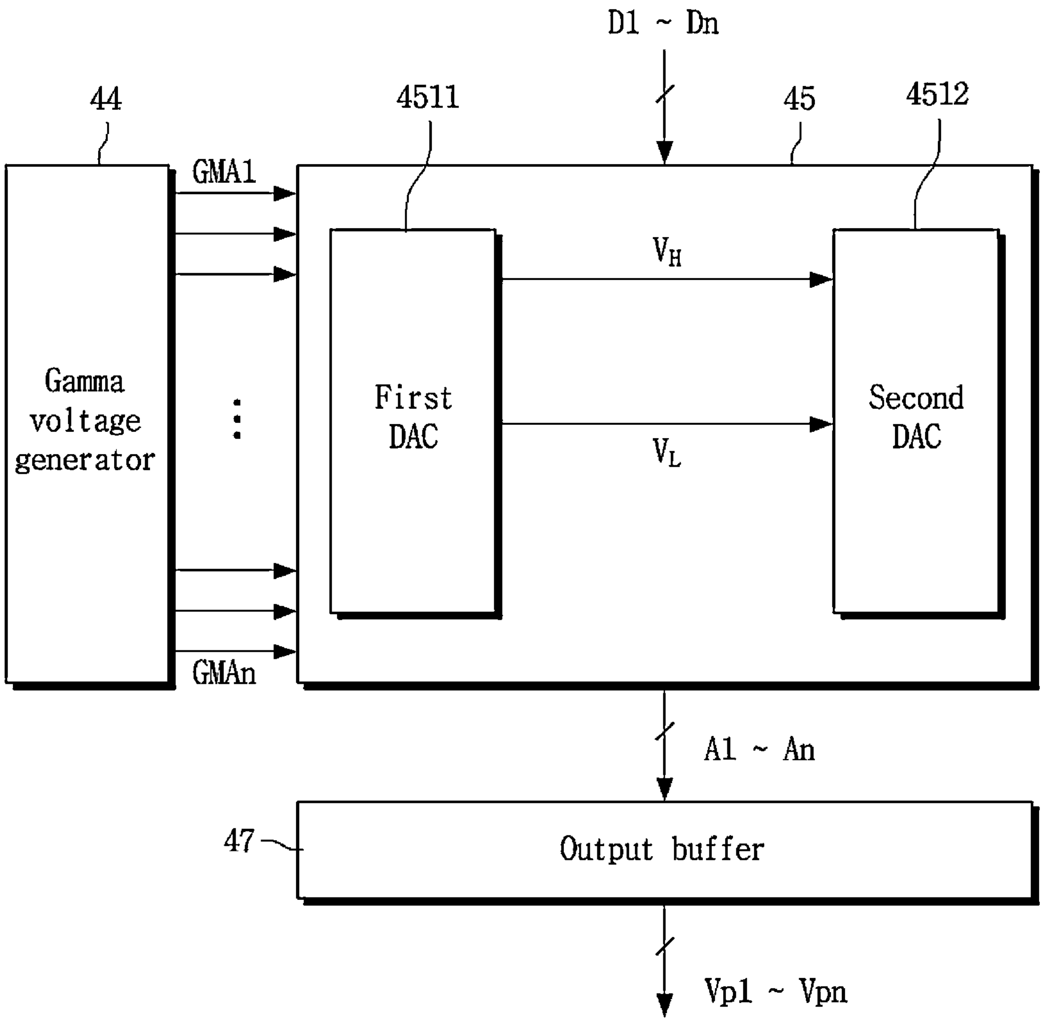
FIG. 3 is a block diagram illustrating some components of the data driver according to an embodiment.

FIG. 3 is a block diagram illustrating some components of the data driver according to an embodiment.

Referring to FIG. 3, the DAC 45 includes the first DAC 4511 and the second DAC 4512 to which a driving voltage VDD is applied.

The first DAC 4511 may be an N-bit DAC supplied with the plurality of gamma voltages GMA1 to GMAn. The first DAC 4511 may be implemented as a DAC which generates the first voltage $V_L$ and the second voltage $V_H$ among the plurality of gamma voltages GMA1 to GMAn by using a switch that is switched in response to bits of the plurality of data signals D1 to Dn. The first DAC 4511 includes a first switching unit PDAC (refer to FIG. 4) including a P type transistor (e.g., a PMOS transistor) as a switch and a second switching unit NDAC including an N type transistor (e.g., an NMOS transistor) as a switch.

The second DAC 4512 is a DAC supplied with the first voltage $V_L$ and the second voltage $V_H$ from the first DAC 4511. The second DAC 4512 may be configured by using a switch for generating the first voltage $V_L$ and the second voltage $V_H$ as the plurality of analog signals A1 to An. The second DAC 4512 includes a first switching unit PDAC (refer to FIG. 4) including a P type transistor (e.g., a PMOS transistor) as a switch and a second switching unit NDAC including an N type transistor (e.g., an NMOS transistor) as a switch.

Hereinafter, the DAC according to an embodiment is described with reference to FIGS. 4 and 5.

Figure 4:
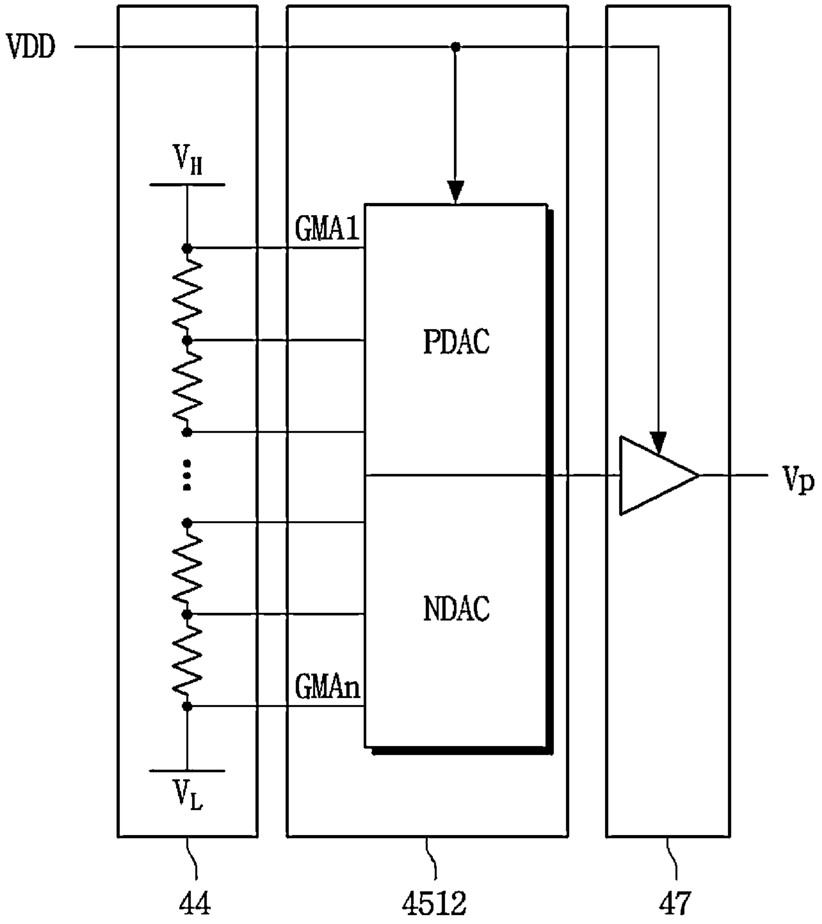
FIG. 4 is a diagram illustrating a configuration of a DAC according to an embodiment.
Figure 5:
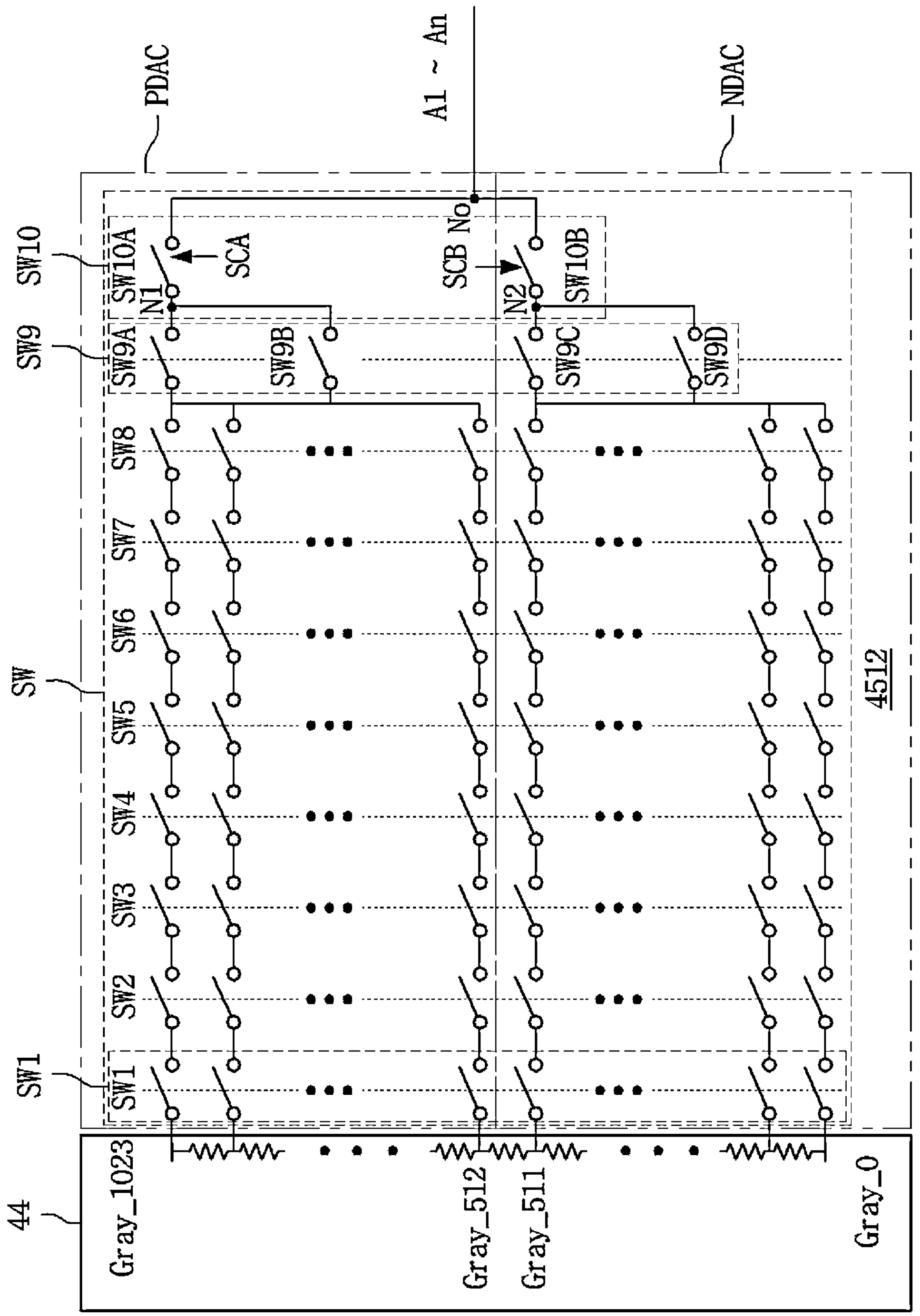
FIG. 5 is a graph illustrating a configuration of a DAC according to an embodiment.

FIGS. 4 and 5 are diagrams illustrating a configuration of the DAC according to an embodiment.

Referring to FIGS. 4 and 5, the DAC 45 includes a switch unit SW including a plurality of switches.

Referring to FIGS. 4 and 5, the second DAC 4512 may generate the plurality of analog signals A1 to An by using the first voltage $V_L$ and the second voltage $V_H$. The second DAC 4512 includes the switch unit SW.

The switch unit SW includes a plurality of switch columns corresponding to the plurality of data signals D1 to Dn. The number of plurality of switches included in the plurality of switch columns is determined based on the number of bits of the plurality of data signals D1 to Dn. If the plurality of data signals D1 to Dn has 10 bits, the switch unit SW may include ten switch columns SW1 to SW10.

The switch columns SW1 to SW10 include the first switching unit PDAC and the second switching unit NDAC corresponding to operation voltage ranges.

The first switching unit PDAC may operate in a first operation voltage range corresponding to grayscales Gray_512 to Gray_1023.

The second switching unit NDAC may operate in a second operation voltage range formed from a voltage corresponding to a grayscale Gray_0 to a voltage corresponding to the grayscale Gray_511. The second operation voltage range is formed a higher voltage level than the first operation voltage range. The center grayscale CG corresponds to the lowest grayscale in the first operation voltage range and corresponds to the highest grayscale in the second operation voltage range.

The first switch column SW1 is a switch column corresponding to the second digital signal LSB. Accordingly, 1,024 switches corresponding to $2^{10}$ may be included in the first switch column SW1.

Four switches SW9A, SW9B, SW9C, and SW9D corresponding to $2^1$ may be included in the ninth switch column SW9.

The tenth switch column SW10 is a switch column corresponding to the first digital signal MSB. Accordingly, two switches SW10A and SW10B corresponding to $2^0$ may be included in the tenth switch column SW10.

In the first switching unit PDAC, the switch SW10A is connected between an output node No and node N1, the node N1 is connected to the switch SW9A and the switch SW9B. A switching operation of the switch SW10A may be controlled in response to a switch control signal SCA. Switching timing of the switch control signal SCA may be controlled in response to the delay signal DE.

In the second switching unit NDAC, the switch SW10B is connected between the output node No and a node N2, the node N2 is connected to the switch SW9C and the switch SW9D. A switching operation of the switch SW10B may be controlled in response to a switch control signal SCB. Switching timing of the switch control signal SCB may be controlled in response to the delay signal DE.

Hereinafter, operation voltage ranges of the first switching unit PDAC and the second switching unit NDAC according to an embodiment are described with reference to FIGS. 6 to 8.

Figure 6:
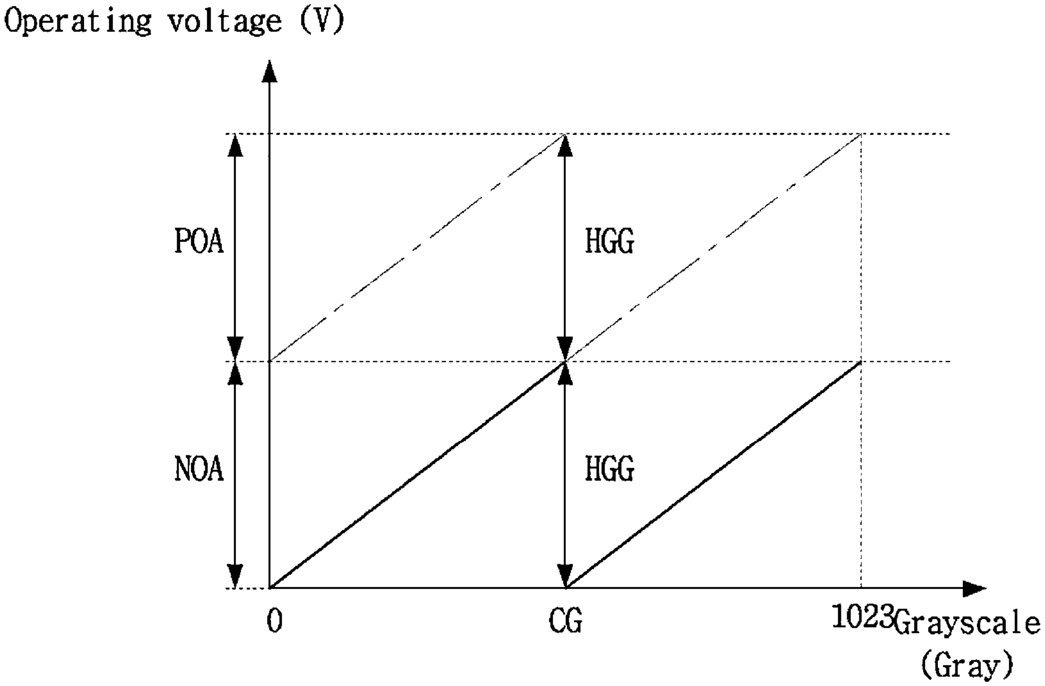
FIG. 6 is a graph illustrating operation voltage ranges of a first switching unit and a second switching unit according to an embodiment.

FIG. 6 is a graph illustrating operation voltage ranges of the first switching unit and the second switching unit according to an embodiment.

Figure 7:
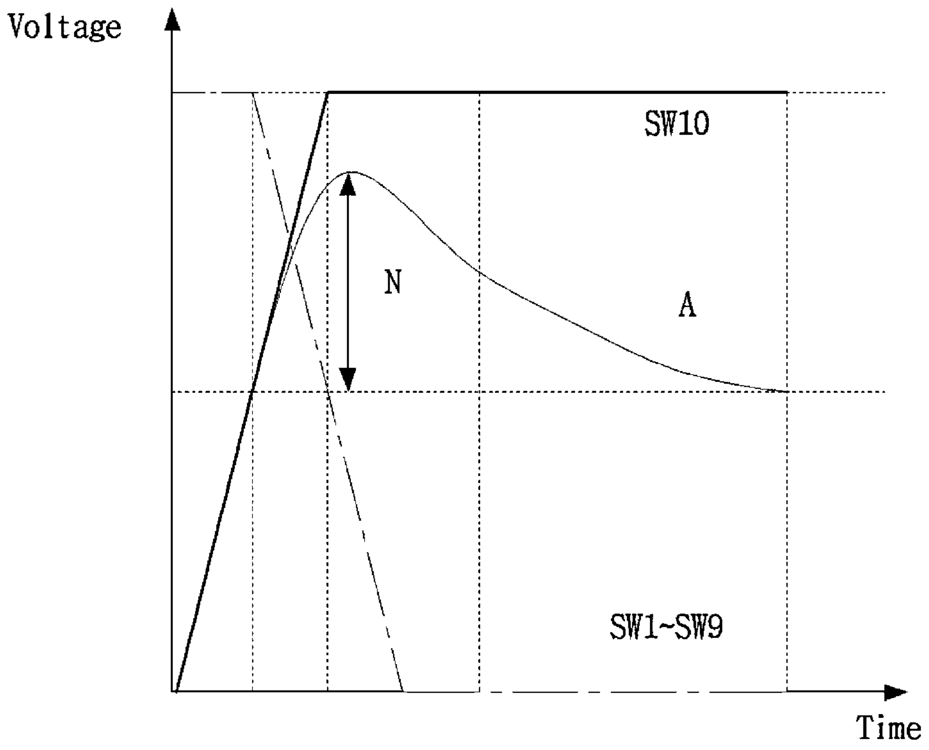
FIGS. 7 and 8 are graphs illustrating noise occurring in a center grayscale.
Figure 8:
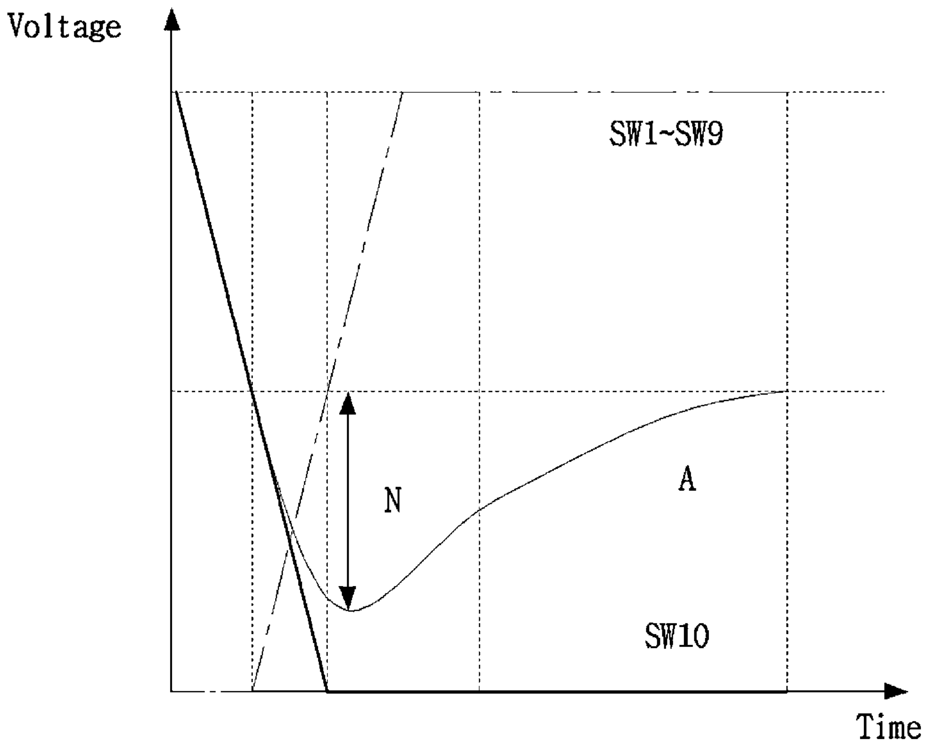

FIGS. 7 and 8 are graphs illustrating a half-gap gamma occurring in a center grayscale.

Referring to FIG. 6, the first switching unit PDAC may perform a switching operation in an operation voltage range POA. The operation voltage range POA is a voltage range between a voltage corresponding to the grayscale Gray_512 and a voltage corresponding to the grayscale Gray_1023. A voltage in the operation voltage range POA is a voltage of the node N1.

The second switching unit NDAC may perform a switching operation in an operation voltage range NOA. The operation voltage range NOA is a voltage range between a voltage corresponding to the grayscale Gray_0 and a voltage corresponding to the grayscale Gray_511. A voltage in the operation voltage range NPOA is a voltage of the node N2.

A noise corresponding to a half-gap gamma (HGG) may be generated in the node N1 and node N2.

In a center grayscale CG, the plurality of input data signals D1 to Dn is changed from 511 gray scales to 512 gray scales, and a noise corresponding to a half-gap gamma (HGG) may be generated at the node N1. And the center grayscale CG is the lowest data grayscale in the operation voltage range POA and the highest data grayscale in the operation voltage range NOA. At the boundary of the center grayscale CG, the nodes N1 and N2 may generate noise corresponding to half-gap gamma (HGG).

Referring to FIG. 7, if the tenth switch column SW10 is switched earlier than another switch column at the center grayscale CG at which the plurality of input data signals D1 to Dn is changed from the grayscale Gray_511 to the grayscale Gray_512, bits of input data are changed from 0111111111 to 1000000000. Accordingly, noise N corresponding to maximum half-gap gamma HGG of the grayscale Gray_511 to the grayscale Gray_1023 at the center grayscale CG occurs in an analog signal A outputted by the second DAC 4512. That is, noise corresponding to the half-gap gamma HGG may occur in the node N2 at the center grayscale CG corresponding to a center grayscale between the grayscales Gray_512 and Gray_511.

Referring to FIG. 8, if the tenth switch column SW10 is switched earlier than another switch column at a center grayscale CG at which the plurality of input data signals D1 to Dn is changed from the grayscale Gray_512 to the grayscale Gray_511, bits of input data are changed from 100000000 to 011111111. Accordingly, noise N corresponding to maximum half-gap gamma HGG of the grayscale Gray_511 to the grayscale Gray_0 at the center grayscale CG occurs in the analog signal A outputted by the second DAC 4512.

Hereinafter, a delay circuit according to an embodiment is described with reference to FIG. 9.

Figure 9:
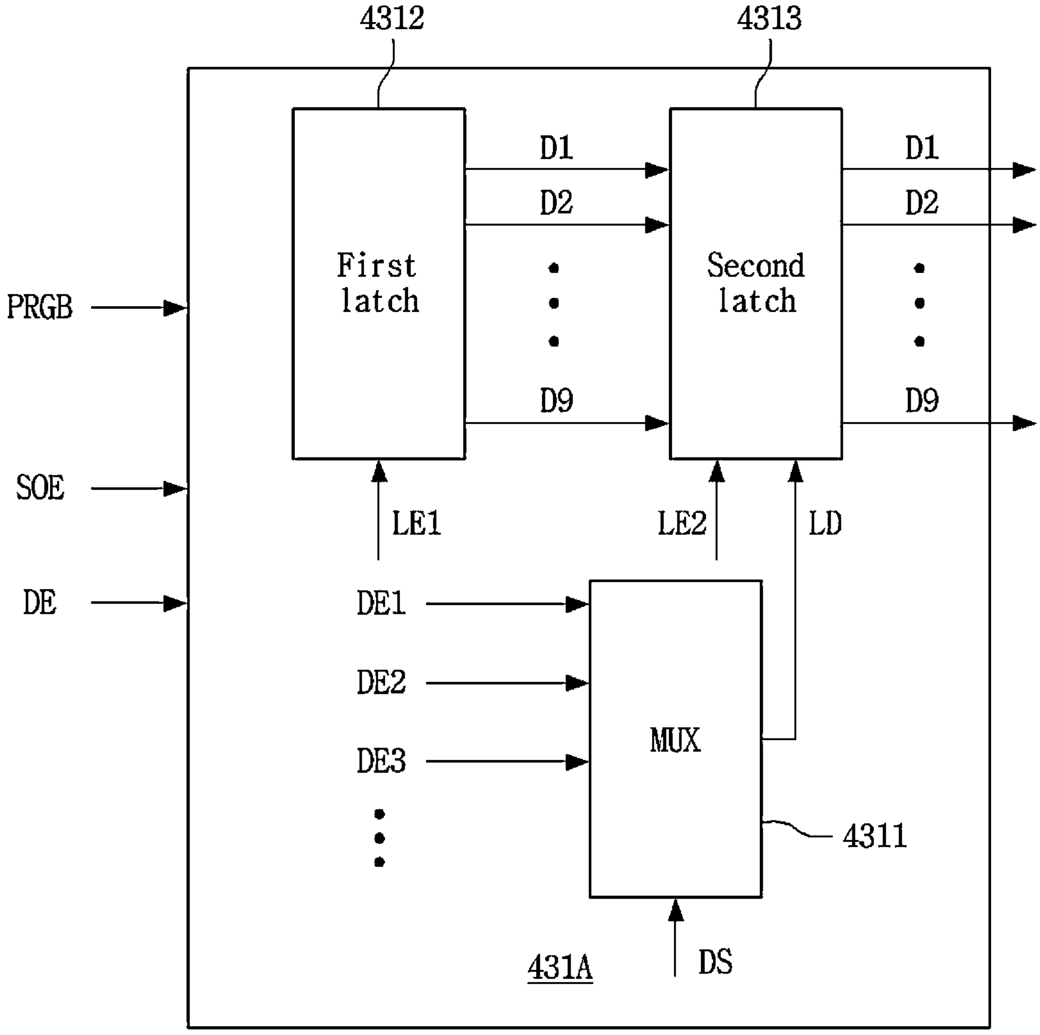
FIG. 9 is a diagram illustrating a configuration of a delay circuit according to an embodiment.

FIG. 9 is a diagram illustrating a configuration of the delay circuit according to an embodiment.

Referring to FIG. 9, a delay circuit 431A may control enable level timing and disable level timing of the first digital signal MSB. For example, the delay circuit 431A may delay the enable level timing and disable level timing of the first digital signal MSB in response to the delay signal DE so that the noise N does not occur. The delay circuit 431A includes a MUX 4311, a first latch 4312, and a second latch 4313. For convenience of description, the delay circuit 431A may delay enable level timing and disable level timing of the first digital signal MSB in response to a latch delay signal LD. A degree that the enable level timing and the disable level timing are delayed may be controlled through a pin or a packet option.

The MUX 4311 may generate the latch delay signal LD so that the first digital signal MSB among the plurality of data signals D1 to D9 is delayed and the delayed signal is outputted for a given time. For example, the MUX 4311 may select any one of a first delay signal DE1 to a third delay signal DE3 in response to a delay selection signal DS. The MUX 4311 may generate the latch delay signal LD based on a time corresponding to the selected delay signal. The first delay signal DE1 to the third delay signal DE3 may include a degree of a delayed time. The delay selection signal DS and the first delay signal DE1 to the third delay signal DE3 may be included in the delay signal DE.

For convenience of description, it has been described that the MUX 4311 generates the latch delay signal LD so that timing at which a level of the first digital signal MSB becomes an enable level and timing at which a level of the first digital signal MSB becomes a disable level are delayed, but an embodiment is not limited thereto. The MUX 4311 may generate a control signal that delays enable level timing and disable level timing of the first digital signal MSB, in response to a selected delay signal.

The first latch 4312 may be a data signal storage latch. The first latch 4312 may store the plurality of data signals D1 to D9 in response to a first latch enable signal LE1. The first latch 4312 may transmit the plurality of stored data signals D1 to D9 to the second latch 4313.

The second latch 4313 may be a data signal retention latch. The second latch 4313 may output the plurality of data signals D1 to D9 in response to a second latch enable signal LE2. At this time, the second latch 4313 may delay the plurality of data signals D1 to D9, corresponding to the first digital signal MSB, for a given time in response to the latch delay signal LD, and output the delayed signals. The first latch enable signal LE1 and the second latch enable signal LE2 may be included in the source output enable signal SOE.

Accordingly, the second latch 4313 may output the data signals D1 to D9 so that the noise N does not occur at the center grayscale CG at which the plurality of input data signals D1 to D9 are changed from the grayscale Gray_511 to the grayscale Gray_512. Furthermore, the second latch 4313 may output the data signals D1 to D9 so that the noise N does not occur at the center grayscale CG at which the plurality of input data signals D1 to D9 are changed from the grayscale Gray_512 to the grayscale Gray_511.

That is, the second latch 4313 may delay enable level timing and disable level timing of the first digital signal MSB between the grayscales Gray_511 and Gray_512 at the boundary between the operation voltage range POA and the operation voltage range NOA. Accordingly, the second latch 4313 may control the first digital signal MSB to reduce noise at the output of the digital-to-analog converter 45.

Hereinafter, a delay circuit according to another embodiment is described with reference to FIGS. 10 and 11.

Figure 10:
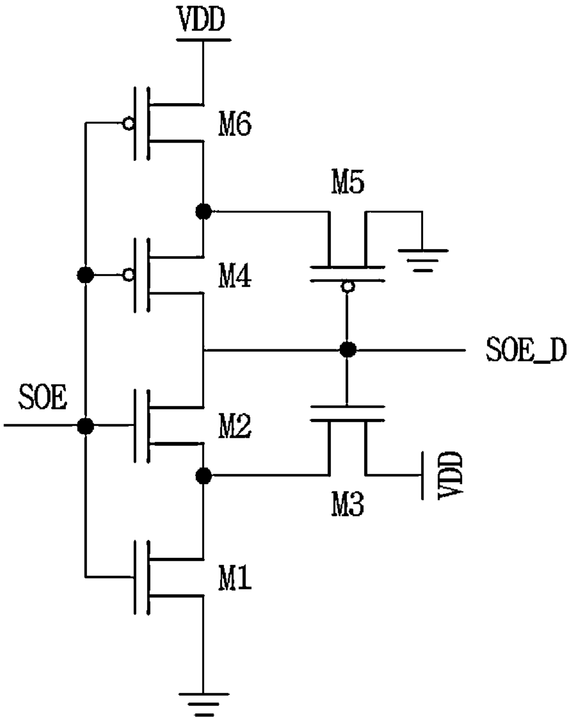
FIGS. 10 and 11 are delay circuits according to another embodiment.
Figure 11:
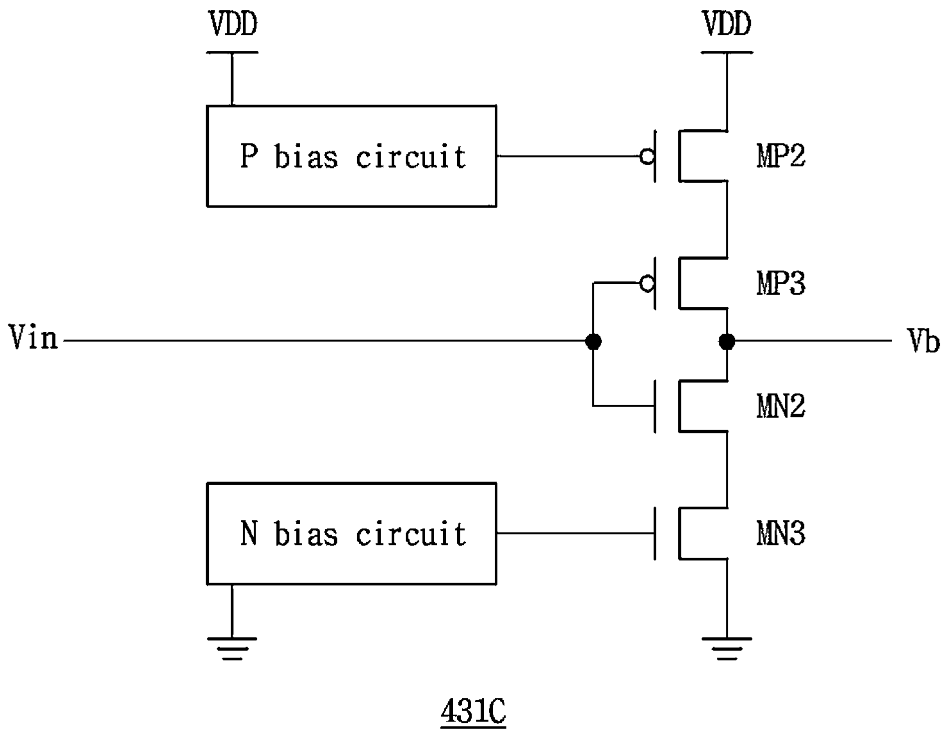

FIGS. 10 and 11 are delay circuits according to another embodiment.

Referring to FIG. 10, the latch circuit 43 may include a delay circuit 431B.

The delay circuit 431B may generate a delayed source output enable signal SOE_D by delaying the source output enable signal SOE. The delay circuit 431B may be a Schmitt inverter circuit including transistors M1, M2, M3, M4, M5, and M6.

Accordingly, the delay circuit 341B may delay, for a given period, timing at which a level of the first digital signal MSB becomes an enable level so that the noise N does not occur at the center grayscale CG at which the plurality of input data signals D1 to D9 are changed from the grayscale Gray_511 to the grayscale Gray_512. Furthermore, the delay circuit 341B may delay, for a given period, timing at which a level of the first digital signal MSB becomes a disable level so that the noise N does not occur at the center grayscale CG at which the plurality of input data signals D1 to D9 are changed from the grayscale Gray_512 to the grayscale Gray_511.

Referring to FIG. 11, the latch circuit 43 may include a delay circuit 431C.

The delay circuit 431C may control a bias voltage Vb of the switch SW10A or SW10B of the tenth switch column SW10. The delay circuit 431C may control the bias voltage Vb by using an input voltage Vin so that a bias current of the switch SW10A or SW10B is controlled. The delay circuit 431C may include PMOS transistors MP1, MP2, and MP3 and P bias circuit which controls bias voltage of PMOS transistors MP1, MP2, and MP3. And the delay circuit 431C may include NMOS transistors MN1, MN2, and MN3 and N bias circuit which controls bias voltage of NMOS transistors MN1, MN2, and MN3.

The P bias circuit and the N bias circuit may operate independently of each other.

Accordingly, the delay circuit 431C may control the bias voltage Vb of the switch SW10A or SW10B so that enable level timing of the first digital signal MSB is delayed at the center grayscale CG at which the plurality of input data signals D1 to D9 is changed from the grayscale Gray_511 to the grayscale Gray_512. That is, the delay circuit 431C may delay the enable level timing of the first digital signal MSB by controlling the bias voltage Vb.

Furthermore, the delay circuit 431C may control the bias voltage Vb of the switch SW10A or SW10B so that disable level timing of the first digital signal MSB is delayed at the center grayscale CG at which the plurality of input data signals D1 to D9 is changed from the grayscale Gray_512 to the grayscale Gray_511. A bias current corresponding to the bias voltage Vb may be controlled through a packet option. That is, the delay circuit 431C may delay the disable level timing of the first digital signal MSB by controlling the bias voltage Vb. A degree that the enable level timing and disable level timing of the first digital signal MSB are delayed at the center grayscale CG may be controlled through a packet option.

Hereinafter, the delay of the first digital signal is described with reference to FIGS. 12 to 15.

Figure 12:
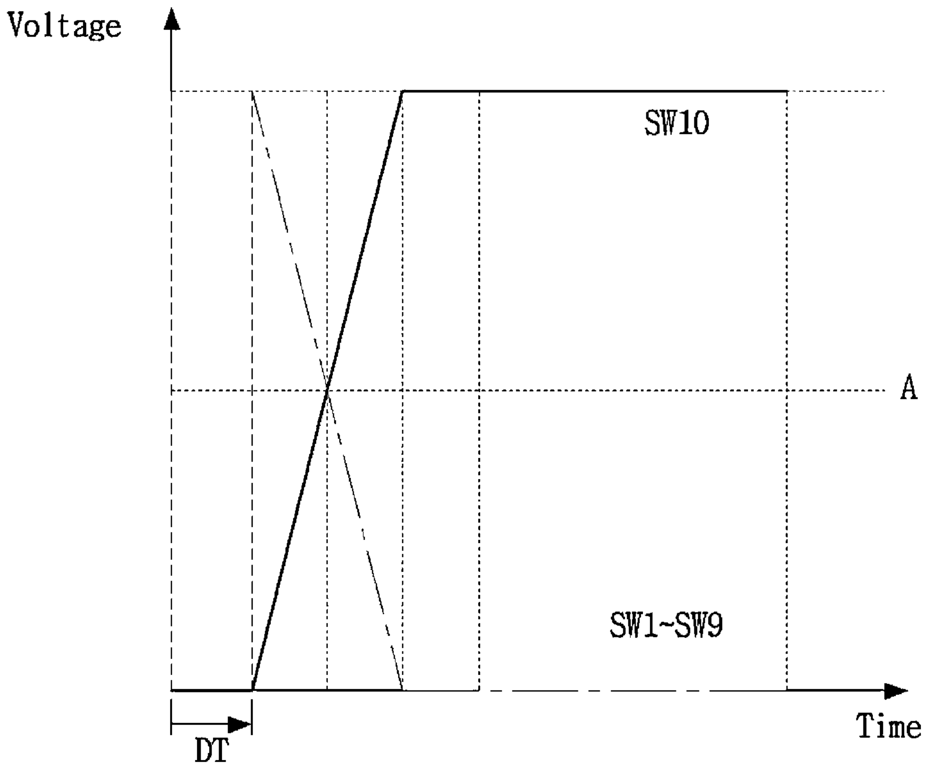
FIG. 12 is a graph illustrating timing at which a level of a first digital signal becomes an enable level according to an embodiment.

FIG. 12 is a graph illustrating timing at which a level of the first digital signal becomes an enable level according to an embodiment.

Figure 13:
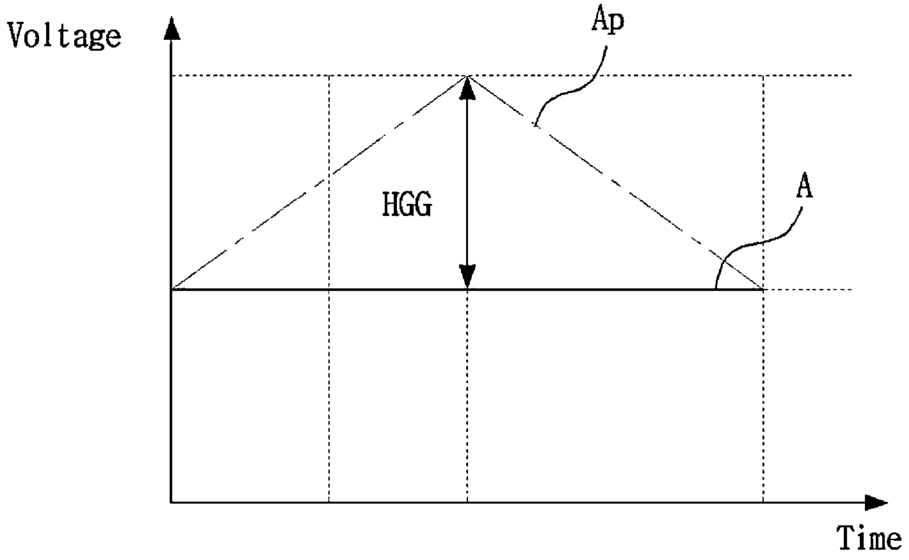
FIG. 13 is a graph illustrating an output signal of a second DAC according to an embodiment.

FIG. 13 is a graph illustrating an output signal of the second DAC according to an embodiment.

Figure 14:
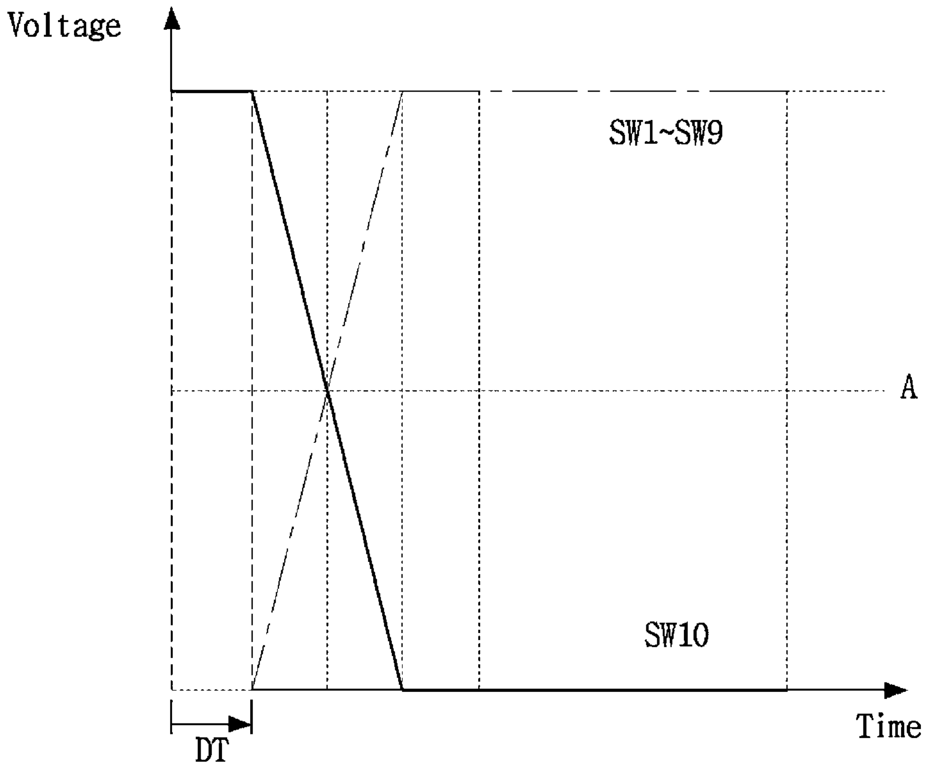
FIG. 14 is a graph illustrating timing at which a level of the first digital signal becomes a disable level according to an embodiment.

FIG. 14 is a graph illustrating timing at which a level of the first digital signal becomes a disable level according to an embodiment.

Figure 15:
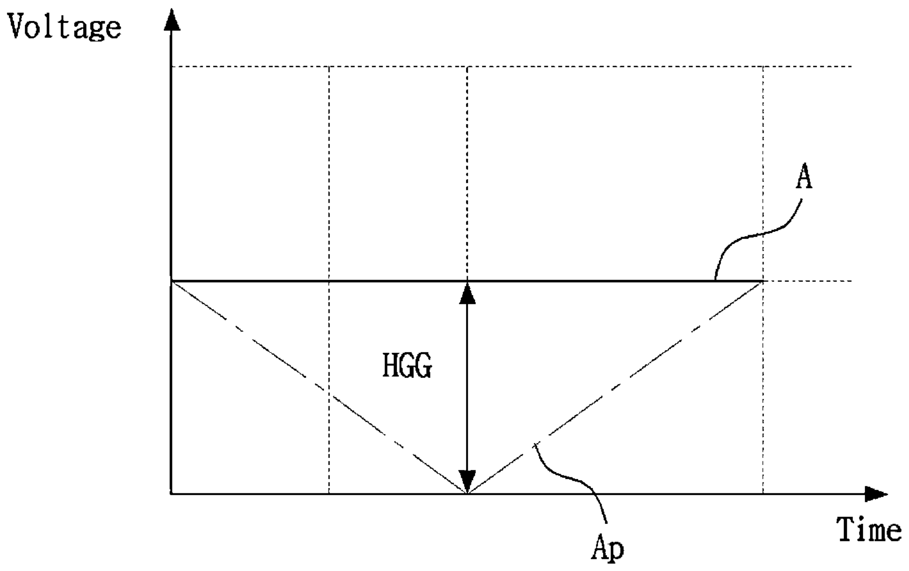
FIG. 15 is a graph illustrating an output signal of the second DAC according to an embodiment.

FIG. 15 is a graph illustrating an output signal of the second DAC according to an embodiment.

Referring to FIGS. 12 and 13, noise corresponding to half-gap gamma HGG may occur in the node N1 at the center grayscale CG at which the plurality of input data signals D1 to Dn is changed from the grayscale Gray_511 to the grayscale Gray_512. Accordingly, noise may be included in an analog signal Ap.

The second DAC 4512 may control an enable level of the first digital signal MSB so that the noise N does not occur. For example, the second DAC 4512 may control the first digital signal MSB so that the first digital signal MSB is delayed for the delay time DT and a level of the first digital signal MSB becomes an enable level. Accordingly, noise of the analog signal A can be removed at the center grayscale CG at which the plurality of input data signals D1 to Dn is changed from the grayscale Gray_511 to the grayscale Gray_512.

Referring to FIGS. 14 and 15, noise corresponding to half-gap gamma HGG may occur in the node N2 at the center grayscale CG at which the plurality of data signals D1 to Dn is changed from the grayscale Gray_512 to the grayscale Gray_511. Accordingly, noise may be included in the analog signal Ap.

The second DAC 4512 may control a disable level of the first digital signal MSB so that the noise N does not occur. For example, the second DAC 4512 may control the first digital signal MSB so that the first digital signal MSB is delayed for the delay time DT and a level of the first digital signal MSB becomes a disable level. Accordingly, noise of the analog signal A can be removed at the center grayscale CG at which the plurality of input data signals D1 to Dn is changed from the grayscale Gray_512 to the grayscale Gray_511.

Accordingly, the data driver 40 according to an embodiment has an effect in that it can reduce noise at center timing at which an operation voltage range of the first switching unit PDAC changes to an operation voltage range of the second switching unit NDAC by controlling a switching operation of the tenth switch column SW10 corresponding to the first digital signal MSB.

What is claimed is:

1. A latch circuit outputting, to a digital analog converter (DAC), a digital signal comprising grayscale data, the latch circuit comprising:

a first latch configured to store the digital signal; and a second latch configured to output the digital signal by controlling first timing at which a level of a first signal included in the digital signal becomes an enable level, based on a center grayscale, wherein the grayscale data comprises first grayscale data and second grayscale data, the first timing is timing at which the second grayscale data is applied by changing from the first grayscale data, and the first signal is a most significant bit (MSB) signal.

2. The latch circuit of claim 1, wherein:

the DAC comprises a first switch comprising a P type transistor and performing a switching operation in a first operation voltage range, and a second switch comprising an N type transistor and performing a switching operation in a second operation voltage range, a boundary between the first operation voltage range and the second operation voltage range corresponds to the center grayscale, the second latch controls the first timing based on the center grayscale so that the first timing is delayed for a delay time, the center grayscale corresponds to the lowest grayscale in the first operation voltage range and corresponds to the highest grayscale in the second operation voltage range.

3. The latch circuit of claim 2, wherein the first switch outputs the first signal in the first operation voltage range and outputs the first signal at the delayed first timing.

4. The latch circuit of claim 3, wherein:

a period of the delay time is controlled in response to a latch delay signal received from an outside, and the second latch controls the first timing in response to the latch delay signal so that the first timing is delayed for the delay time.

5. The latch circuit of claim 3, wherein:

the latch circuit further comprises a multiplexer (MUX) configured to select a delay time and generate a latch delay signal, and the second latch controls the first timing in response to the latch delay signal so that the first timing is delayed for the selected delay time.

6. A data driver comprising:
a digital analog converter (DAC) configured to convert, into an analog signal, a digital signal comprising grayscale data; and
a latch circuit configured to transmit the digital signal to the DAC,
wherein the latch circuit comprises:
a first latch configured to store the digital signal; and
a second latch configured to output the digital signal by controlling first timing at which a level of a first signal included in the digital signal becomes an enable level, based on a center grayscale,
wherein the grayscale data comprises first grayscale data and second grayscale data,
the first timing is timing at which the second grayscale data is applied by changing from the first grayscale data, and
the first signal is a most significant bit (MSB) signal.

7. The data driver of claim 6, wherein:
the DAC comprises a first switch comprising a P type transistor and performing a switching operation in a first operation voltage range, and a second switch comprising an N type transistor and performing a switching operation in a second operation voltage range,
a boundary between the first operation voltage range and the second operation voltage range corresponds to the center grayscale,
the second latch controls the first timing based on the center grayscale so that the first timing is delayed for a delay time, and
the center grayscale corresponds to the lowest grayscale in the first operation voltage range and corresponds to the highest grayscale in the second operation voltage range.

8. The data driver of claim 7, wherein the first switch outputs the first signal in the first operation voltage range and outputs the first signal at the delayed first timing.

9. The data driver of claim 8, wherein:
a period of the delay time is controlled in response to a latch delay signal received from an outside, and
the second latch controls the first timing in response to the latch delay signal so that the first timing is delayed for the delay time.

10. The data driver of claim 8, wherein:
the latch circuit further comprises a MUX configured to select a delay time and generate a latch delay signal, and
the second latch controls the first timing in response to the latch delay signal so that the first timing is delayed for the selected delay time.

11. A latch circuit outputting, to a digital analog converter (DAC), a digital signal comprising grayscale data, the latch circuit comprising:
a first latch configured to store the digital signal; and
a second latch configured to output the digital signal by controlling first timing at which a level of a first signal included in the digital signal becomes an enable level and second timing at which a level of the first signal becomes a disable level,
wherein the grayscale data comprises first grayscale data and second grayscale data,
the first timing is timing at which the second grayscale data is applied by changing from the first grayscale data,
the second timing is timing at which the first grayscale data is applied by changing from the second grayscale data, and
the first signal is a most significant bit (MSB) signal.

12. The latch circuit of claim 11, wherein:
the DAC comprises a first switch comprising a P type transistor and performing a switching operation in a first operation voltage range, and a second switch comprising an N type transistor and performing a switching operation in a second operation voltage range, and
the second latch controls the first timing and the second timing so that the first timing and the second timing are delayed for a delay time, based on the grayscale data corresponding to a boundary between the first operation voltage range and the second operation voltage range.

13. The latch circuit of claim 12, wherein:
the first switch outputs the first signal at the delayed first timing in the first operation voltage range, and
the second switch outputs the first signal at the delayed second timing in the second operation voltage range.

14. The latch circuit of claim 13, wherein:
the digital signal is outputted to the DAC in response to an output enable signal, and
the latch circuit further comprises a delay circuit configured to control the output enable signal so that the first timing and the second timing are delayed for the delay time.

15. The latch circuit of claim 13, further comprising a delay circuit configured to control a bias voltage of the first switch and a bias voltage of the second switch so that the first timing and the second timing are delayed for the delay time.

16. A data driver comprising:
a digital analog converter (DAC) configured to convert, into an analog signal, a digital signal comprising grayscale data; and
a latch circuit configured to transmit the digital signal to the DAC,
wherein the latch circuit comprises:
a first latch configured to store the digital signal; and
a second latch configured to output the digital signal by controlling first timing at which a level of a first signal included in the digital signal becomes an enable level and second timing at which a level of the first signal becomes a disable level,
wherein the grayscale data comprises first grayscale data and second grayscale data,
the first timing is timing at which the second grayscale data is applied by changing from the first grayscale data,
the second timing is timing at which the first grayscale data is applied by changing from the second grayscale data, and
the first signal is a most significant bit (MSB) signal.

17. The data driver of claim 16, wherein:
the DAC comprises a first switch comprising a P type transistor and performing a switching operation in a first operation voltage range, and a second switch comprising an N type transistor and performing a switching operation in a second operation voltage range, and
the second latch controls the first timing and the second timing so that the first timing and the second timing are delayed for a delay time, based on the grayscale data corresponding to a boundary between the first operation voltage range and the second operation voltage range.

18. The data driver of claim 17, wherein:

the first switch outputs the first signal at the delayed first timing in the first operation voltage range, and the second switch outputs the first signal at the delayed second timing in the second operation voltage range.

19. The data driver of claim 18, wherein:

the digital signal is outputted to the DAC in response to an output enable signal, and the latch circuit further comprises a delay circuit configured to control the output enable signal so that the first timing and the second timing are delayed for the delay time.

20. The data driver of claim 18, wherein the latch circuit further comprises a delay circuit configured to control a bias voltage of the first switch and a bias voltage of the second switch so that the first timing and the second timing are delayed for the delay time.

* * * * *